United States Patent
Choi et al.

(10) Patent No.: US 7,711,011 B2
(45) Date of Patent: May 4, 2010

(54) PLAY-OUT APPARATUS AND METHOD FOR SWITCHING A CHANNEL IN A DIGITAL MULTIMEDIA BROADCASTING RECEIVER

(75) Inventors: Kwang-Pyo Choi, Anyang-si (KR); Young-O Park, Suwon-si (KR); Kwang-Cheol Choi, Gwacheon-si (KR); Jae-Hyun Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 973 days.

(21) Appl. No.: 11/474,557

(22) Filed: Jun. 26, 2006

(65) Prior Publication Data

US 2006/0290808 A1 Dec. 28, 2006

(30) Foreign Application Priority Data

Jun. 24, 2005 (KR) .................. 10-2005-0055075

(51) Int. Cl.
*H04J 3/04* (2006.01)

(52) U.S. Cl. .................. 370/535; 370/553; 370/389; 370/516; 375/376

(58) Field of Classification Search ......... 370/200–253, 370/272–390, 431–546
See application file for complete search history.

(56) References Cited

U.S. PATENT DOCUMENTS 6,598,172 B1 * 7/2003 VanDeusen et al. ......... 713/503

2002/0087973 A1 * 7/2002 Hamilton et al. ............ 725/32
2003/0035650 A1 * 2/2003 Demas et al. ............... 386/112
2004/0160974 A1 8/2004 Read et al.

FOREIGN PATENT DOCUMENTS

KR 1020020009419 2/2002
KR 1020060087966 8/2006

* cited by examiner

*Primary Examiner*—Ricky Ngo
*Assistant Examiner*—Iqbal Zaidi
(74) *Attorney, Agent, or Firm*—The Farrell Law Firm, LLP (57) ABSTRACT

A play-out apparatus and method for switching a channel in a digital multimedia broadcasting receiver are provided which can decrease a delay occurring in a channel switching time. A demultiplexer demultiplexes a signal received from a transmitter and outputs video data. A time stamp adapter changes a time stamp for indicating a play-out time of the video data such that the video data can be immediately output from a playback buffer without a Coder-Decoder (CODEC) delay, and outputs the video data including the changed time stamp. The playback buffer buffers and outputs the video data output from the time stamp adapter according to the changed time stamp. A video decoder decodes and outputs the video data output from the playback buffer according to the changed time stamp. A display unit plays the decoded video data out.

20 Claims, 8 Drawing Sheets

PLAY-OUT APPARATUS AND METHOD FOR SWITCHING A CHANNEL IN A DIGITAL MULTIMEDIA BROADCASTING RECEIVER

PRIORITY

This application claims priority under 35 U.S.C. §119 to an application entitled "Play-out Apparatus and Method for Switching a Channel in a Digital Multimedia Broadcasting Receiver" filed in the Korean Intellectual Property Office on Jun. 24, 2005 and assigned Ser. No. 2005-55075, the contents of which are incorporated herein by reference.

BACKGROUND OF THE INVENTION

1. Field of the Invention

The present invention relates generally to a broadcasting system, and in particular, to a play-out apparatus and method for switching a channel in a Digital Multimedia Broadcasting (DMB) receiver.

2. Description of the Related Art

Conventionally, digital broadcasting is a system for providing users with high-quality images, Compact Disk (CD)-quality sounds, and high-level services that can replace the conventional analog broadcasting system. The digital broadcasting system provides broadcast traffic compressed at a high compression rate according to Moving Picture Experts Group-2 (MPEG-2) and MPEG-4 standards and so on. The digital broadcasting system employs the high compression rate because of the large amount of data/information to be transmitted from the digital broadcasting system. A typical example of a digital broadcasting service is a Digital Multimedia Broadcasting (DMB) service.

The DMB service can provide various multimedia signals such as audio, video, etc. For example, as a concept of wireless broadcasting in which a broadcast can be only listened to is extended to a new concept of wireless broadcasting in which a broadcast can be listened to and viewed, various multimedia information such as traffic and news information as well as a music broadcast can be provided in the form of text, graphic, video, and so on. In case of video broadcasting, a system interworks with an existing digital broadcasting network for terrestrial broadcasting, satellite broadcasting, cable television (TV), etc., to provide various multimedia services, and interworks with a Intelligent Transport System (ITS), Global Positioning System (GPS), and so on to provide a telematics service.

Specifically, the DMB service provides high-quality sound and video broadcasts in CD and Digital Video Disc (DVD) levels to mobile terminals such as a mobile phone, Personal Digital Assistant (PDA), and in-vehicle terminal on the move as well as fixed terminals. Thus, it is predicted that there will be a significant increase use of the DMB service. The DMB service can be divided into a terrestrial DMB service and a satellite DMB service. Herein, the terrestrial DMB service can provide a broadcasting service using a terrestrial relay, and the satellite DMB service can provide a broadcasting service using a terrestrial or satellite relay.

Figure 1:
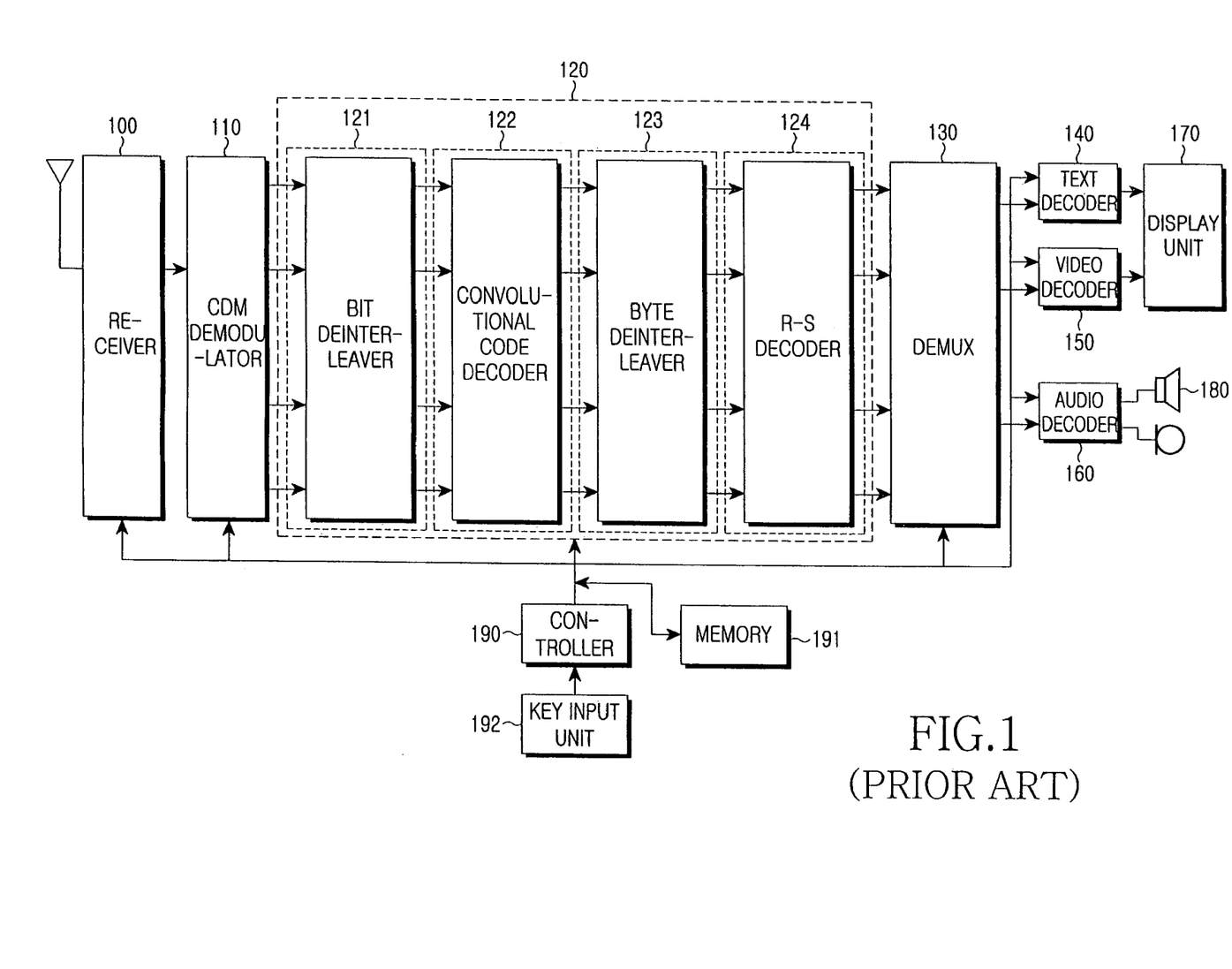
FIG. 1 illustrates a structure of a conventional Digital Multimedia Broadcasting (DMB) receiver.

Next, a DMB system for providing the DMB service will be briefly described with reference to FIG. 1. FIG. 1 illustrates a structure of a conventional DMB receiver.

Referring to FIG. 1, a receiver 100 receives a signal from a gap filler corresponding to a DMB satellite or terrestrial relay. The receiver 100 frequency-converts a DMB channel signal and then outputs the frequency-converted signal to a Code Division Multiplexing (CDM) demodulator 110. The CDM demodulator 110 spreads and demodulates a received broadcast channel signal using a Walsh code of an associated received channel. Transmitted packets output from the CDM demodulator 110 correspond to a Transport Stream (TS) of a selected channel. The TS is input to a Forward Error Correction (FEC) unit 120. At this time, the output of the CDM demodulator 110 is input to the FEC unit 120 on the basis of each Walsh code of the received channel. The FEC unit 120 corrects error due to noise or interference during transmission. The FEC unit 120 is provided with a bit deinterleaver 121, a convolutional code decoder 122, a byte deinterleaver 123, and a Reed-Solomon (RS) decoder 124. The bit deinterleaver 121 deinterleaves broadcast signals received from the CDM demodulator 110 in a bit unit in order to change burst error into distributed error. The deinterleaved satellite broadcast signals are input to the convolutional code decoder 122. Because the output signals of the bit deinterleaver 121 are convolutionally coded signals, the convolutional code decoder 122 inputs the signals to the byte deinterleaver 123 after error correction. The byte deinterleaver 123 deinterleaves the broadcast signals output from the convolutional code decoder 122 in a byte unit. The byte deinterleaver 123 changes burst error into distributed error in the byte unit. When the convolutional code decoder 122 does not suitably correct the error, the byte deinterleaver 123 corrects a burst error if one has occurred.

The broadcast signals output from the byte deinterleaver 123 are input to the Reed-Solomon decoder 124. The Reed-Solomon decoder 124 recovers the deinterleaved signals from error using parity data and then outputs the recovered signals to a demultiplexer (DEMUX) 130. The demultiplexer 130 separates a decoded TS into voice, video, and text data packets. The voice, video, and text data packets output from the demultiplexer 130 are input to an audio decoder 160, a video decoder 150, and a text decoder 140, respectively. The text decoder 140 decodes the compressed text data packet, such that a display unit 170 displays text data. The video decoder 150 converts a compressed video data packet into a format suitable for the display unit 170 through a video processor (not illustrated), such that the display unit 170 displays video data. The audio decoder 160 decodes a compressed voice data packet, and converts the decoded voice data packet into an analog signal through a Digital to Analog Converter (DAC) (not illustrated), such that a speaker 180 outputs voice data. A controller 190 controls the components of the DMB receiver such that a DMB service can be received. A memory 191 stores a control program for performing various control functions and data necessary for control. A key input unit 192 allows a user to change or select a service by manipulating a key for a service change request.

Figure 2:
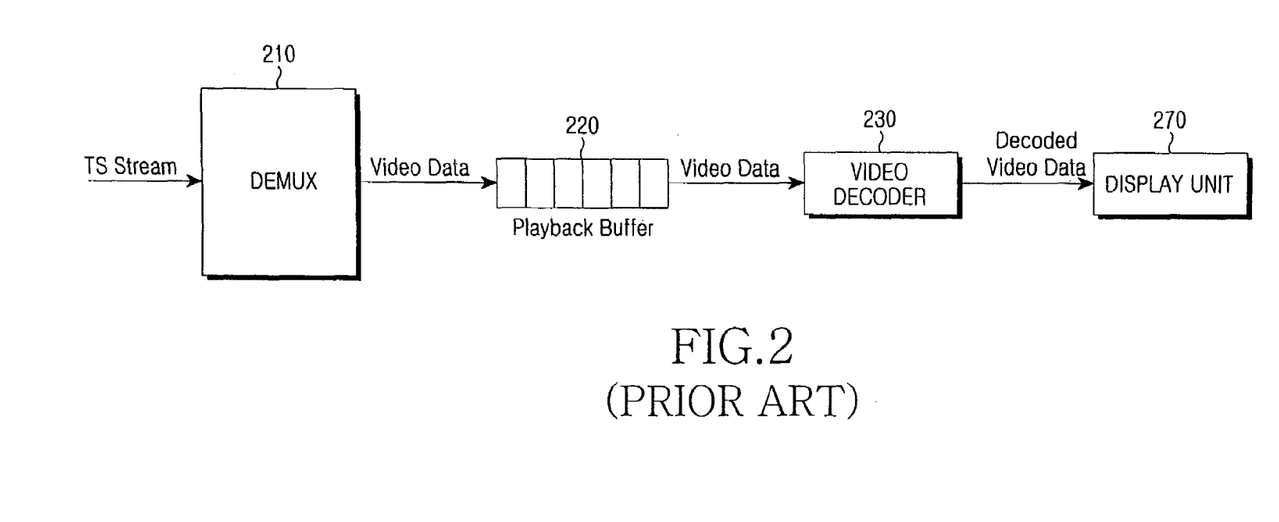
FIG. 2 illustrates a process for buffering video data output from a demultiplexer in a playback buffer to switch a channel in the conventional DMB receiver.

FIG. 2 illustrates a process for buffering video data output from a demultiplexer in a playback buffer to switch a channel in the conventional DMB receiver. An operation for switching a channel in the DMB receiver in case of the conventional satellite DMB will be described with reference to FIG. 2.

As illustrated in FIG. 2, the demultiplexer 210 receives a TS, separates the TS into video and audio data, and outputs the video and audio data to the playback buffer 220. In the present invention, the audio data is not considered under assumption that only the video data is output to the playback buffer 220.

The video data is sequentially accumulated and then is output after a predetermined time. Herein, a time stamp of the video data transmitted from a broadcasting station indicates the predetermined time. That is, when the video data is transmitted from the broadcasting station, the time stamp is included and transmitted in the video data.

The video decoder 230 decodes the video data and then outputs the decoded video data to the display unit 270, such that the display unit 270 can play the decoded video data.

In case of the conventional satellite DMB, a delay for new information acquisition occurs when a broadcasting service or channel is switched in the DMB receiver. This delay occurs for two reasons.

First, if CDM is applied to the satellite DMB receiver, a delay occurs in a process for emptying an interleave buffer and filling a deinterleave buffer when a channel is switched. That is, the delay occurs in a network used to change a CDM channel signal currently being received into a baseband signal. The network delay is defined as the delay between the receiver 100 and the demultiplexer 130 in FIG. 1.

Second, a Coder-Decoder (CODEC) delay occurs when an actual decoding task is started in a multimedia CODEC for a stable play-out process after a buffering operation of the playback buffer during a period of about 2 sec. The CODEC delay is defined as the delay until a play-out operation is performed in the video decoder 150 after the demultiplexer 130 in FIG. 1. According to the actual testing, a delay time is about 5~6 sec when a channel is switched in the satellite DMB receiver. In this case, a network delay time is about 3~4 sec and a CODEC delay time is about 2 sec. Thus, the delay should decrease such that the user can smoothly receive a broadcasting service without being inconvenienced when a channel is switched.

SUMMARY OF THE INVENTION

It is, therefore, an object of the present invention to provide a play-out apparatus and method for switching a channel that can minimize a delay for new information acquisition when the channel is switched in case of satellite Digital Multimedia Broadcasting (DMB) in a DMB service receiver.

It is another object of the present invention to provide a play-out apparatus and method for switching a channel that can smoothly provide a service by quickly switching the channel in a DMB service receiver.

It is another object of the present invention to provide a play-out apparatus and method for switching a channel that can minimize a Code-Decoder (CODEC) delay in a DMB service receiver.

It is yet another object of the present invention to provide a play-out apparatus and method for switching a channel that decreases a CODEC delay in a DMB service receiver.

In accordance with an aspect of the present invention, there is provided an apparatus for reproducing broadcast data in a digital multimedia broadcasting system for providing a digital multimedia broadcasting service, including a demultiplexer for demultiplexing a signal received from a transmitter and outputting video data; a time stamp adapter for changing a time stamp for indicating a play-out time of the video data such that the video data can be immediately output from a playback buffer without a Coder-Decoder (CODEC) delay, and outputting the video data including the changed time stamp; the playback buffer for buffering and outputting the video data output from the time stamp adapter according to the changed time stamp; a video decoder for decoding and outputting the video data output from the playback buffer according to the changed time stamp; and a display unit for reproducing the decoded video data.

In accordance with another aspect of the present invention, there is provided an apparatus for reproducing broadcast data in a digital multimedia broadcasting system for providing a digital multimedia broadcasting service, including a demultiplexer for demultiplexing a signal received from a transmitter and outputting video data; a video decoder for decoding and outputting the video data output from the demultiplexer; a time stamp adapter for changing a time stamp for indicating a play-out time of the video data output from the video decoder such that the video data can be immediately output from a playback buffer without a Coder-Decoder (CODEC) delay, and outputting the video data including the changed time stamp; the playback buffer for buffering and outputting the video data output from the time stamp adapter according to the changed time stamp; and a display unit for reproducing the video data output from the playback buffer.

In accordance with another aspect of the present invention, there is provided a method for reproducing broadcast data in a digital multimedia broadcasting system for providing a digital multimedia broadcasting service, including demultiplexing a signal received from a transmitter and outputting video data; changing a time stamp for indicating a play-out time of the video data such that the video data can be output from a playback buffer without a Coder-Decoder (CODEC) delay, and outputting the video data including the changed time stamp; buffering and outputting the video data in the playback buffer according to the changed time stamp; decoding and outputting the video data output from the playback buffer according to the changed time stamp; and reproducing the decoded video data.

In accordance with yet another aspect of the present invention, there is provided a method for reproducing broadcast data in a digital multimedia broadcasting system for providing a digital multimedia broadcasting service, including demultiplexing a signal received from a transmitter and outputting video data; decoding and outputting the video data; changing a time stamp for indicating a play-out time of the decoded video data such that the video data can be immediately output from a playback buffer without a Coder-Decoder (CODEC) delay, and outputting the video data comprising the changed time stamp; buffering and outputting the video data in the playback buffer according to the changed time stamp; and reproducing the video data output from the playback buffer.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for clarity and conciseness. It is to be understood that the phraseology and terminology employed herein are for the purpose of description and should not be regarded as limiting the present invention.

As a Digital Multimedia Broadcasting (DMB) system to which the present invention is applicable, described herein is an example of a satellite DMB system. It is assumed that the satellite DMB system multiplexes and transmits data according to the Moving Picture Experts Group-2 Transport Stream (MPEG2-TS) standard used in the current satellite DMB.

Figure 3:
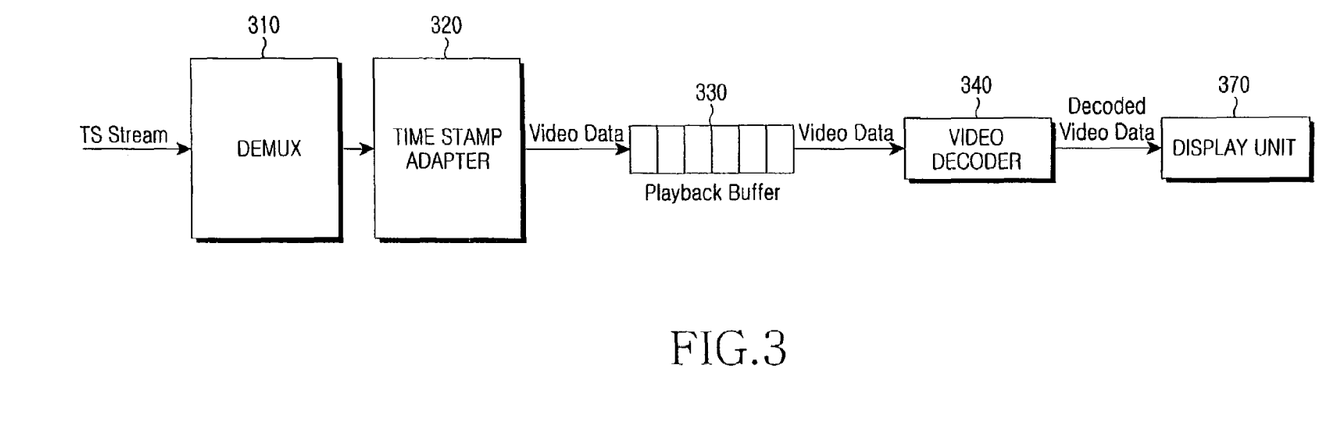
FIG. 3 illustrates a process for buffering video data output from a demultiplexer in a playback buffer to switch a channel in a DMB receiver in accordance with the present invention.

FIG. 3 illustrates a process for buffering video data output from a demultiplexer (DEMUX) in a playback buffer to switch a channel in a DMB receiver in accordance with the present invention. Referring to FIG. 3, an operation for buffering the video data in the playback buffer will be described herein.

The demultiplexer 310 receives a TS, demultiplexes the received TS, and outputs the demultiplexed TS to a time stamp adapter 320. At this time, the demultiplexer 310 separates the received TS into video and audio data. For convenience of explanation, the present invention considers only the video data output from the demultiplexer 310. The time stamp adapter 320 outputs the video data received from the demultiplexer 310 to the playback buffer 330. In accordance with the present invention, a time stamp is changed and the changed time stamp is included in the video data. The video data with the changed time stamp is output to the playback buffer 330.

Conventionally, a frame input to the playback buffer 330 is output to the video decoder 340 according to time stamp of the video data transmitted from a broadcasting station. The time stamp adapter 320 controls an operation for outputting the frame input to the playback buffer 330 to the video decoder 340 according to time provided in the present invention. That is, the time stamp adapter 320 changes the time stamp to include the changed time stamp in the video data such that the frame input to the playback buffer 330 can be output to the video decoder 340 according to time provided in the present invention, and outputs the video data with the changed time stamp. The time provided in the present invention will be described below in detail with reference to FIGS. 4C and 6C.

When the video data is input to the playback buffer 330, it is output to the video decoder 340 according to the time stamp changed by the time stamp adapter 320. Subsequently, the video decoder 340 decodes the video data and then outputs the decoded video data to the display unit 370. The display unit 370 plays the video data out. In the present invention, it must be noted that the video decoder 340 may be directly connected to an output terminal of the demultiplexer 310.

Figure 4A:
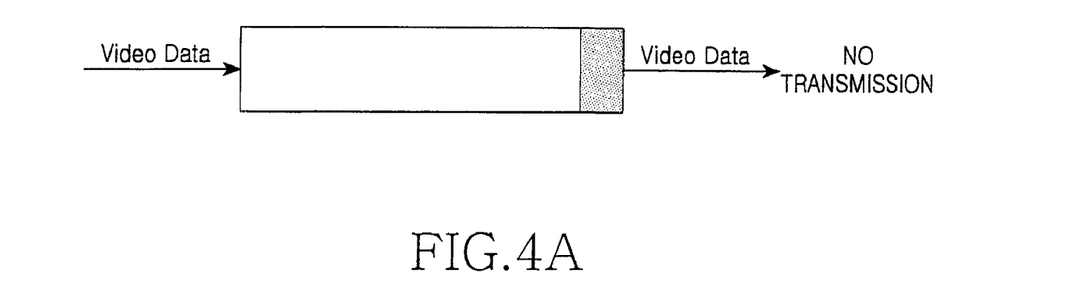
FIGS. 4A, 4B, and 4C illustrate a comparison between the conventional operation and an example of an operation of the playback buffer in the DMB receiver in accordance with the present invention.
Figure 4B:
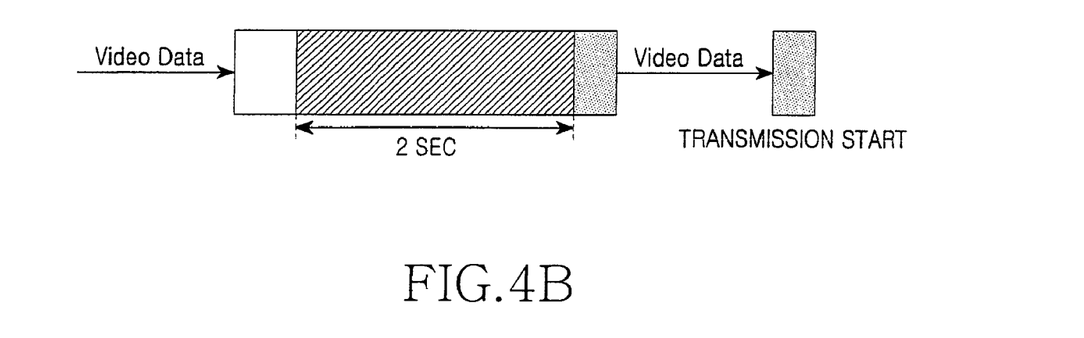
Figure 4C:
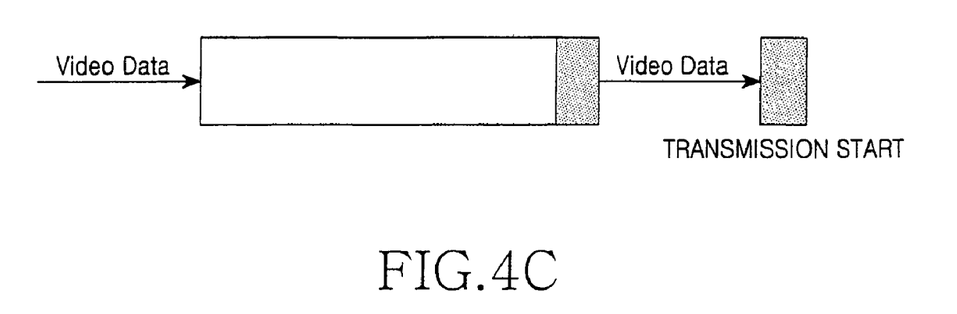

FIGS. 4A, 4B, and 4C illustrate a comparison between the conventional operation and an example of an operation of the playback buffer in the DMB receiver in accordance with the present invention. A buffering process of the playback buffer 330 will be described with reference to FIGS. 4A, 4B, and 4C.

When receiving the first frame as illustrated in FIG. 4A according to the conventional art, the playback buffer 330 does not immediately output the frame to the video decoder 340. That is, as illustrated in FIG. 4B according to the conventional art, the playback buffer 330 receives the first frame and outputs video data to the video decoder 340 in a Constant Time Interval (CTI) after a buffering operation during about 2 sec. That is, the playback buffer 330 outputs the video data to the video decoder 340 according to time stamp of the video data transmitted from the broadcasting station according to the conventional art. However, when receiving the first frame data as illustrated in FIG. 4C in accordance with the present invention, the playback buffer 330 immediately outputs the received data to the video decoder 340. The video decoder 340 decodes the input data into the format in which the data can be played out through the display unit 370, and outputs the decoded data to the display unit 370. The display unit 370 plays the decoded video data out. Because a process for changing a time stamp in the time stamp adapter 320 is first performed in accordance with the present invention, the video decoder 340 receives the video data from the playback buffer 330 on the basis of the changed time stamp different from a time stamp value mapped to a frame rate of a constant interval transmitted from the broadcasting station. For this reason, an amount of video data of the playback buffer 330 gradually increases. After video data during about 2 sec is accumulated in the playback buffer 330, the video decoder 340 decodes the video data at a frame rate that is the same as that of the conventional system, and outputs the decoded video data to the display unit 370. The display unit 370 plays the decoded video data.

This method has a lower frame rate until a desired amount of video data is accumulated in the playback buffer 330 in comparison with the conventional method. However, when the process for changing a time stamp is applied, the user cannot observe a difference in quality of a displayed image between the provided method and the conventional method.

Next, a method for changing a time stamp value in the time stamp adapter 320 will be described herein.

A time in which the video data is conventionally displayed through the display unit 370 can be defined as shown in Equation (1) below.

$$P_i = T + t_i \quad (1)$$

In the provided method of the present invention, $P_i$ can be defined as shown in Equation (2) below.

$$P_i = \alpha \times t_i, \text{ if } t_i < M(\alpha = t_i, T, M)$$

$$\text{Otherwise, } P_i = T + t_i \quad (2)$$

Herein, $P_i$ is a time in which the video data is displayed through the display unit 370, T is a buffering time in a CODEC for stable play out, i.e., a CODEC delay, and $t_i$ is a time stamp of the video data transmitted from the broadcasting station.

When the broadcasting station actually transmits the video data, time stamp information for indicating a play out time is inserted into every video frame. In the actual implementation, an initial value of the time stamp is set to an arbitrary value. For convenience of explanation in the present invention, it is assumed that an initial value of $t_i$ is 0. Referring to Equation (2), $\alpha$ is a value for determining a frame rate in accordance with the present invention. A system with various characteristics can be implemented according to a method for designating the $\alpha$ value. M is a constant for determining when the time in which the video data is played out through the display unit 370 is equal to a play-out time of a conventional system.

Figure 5:
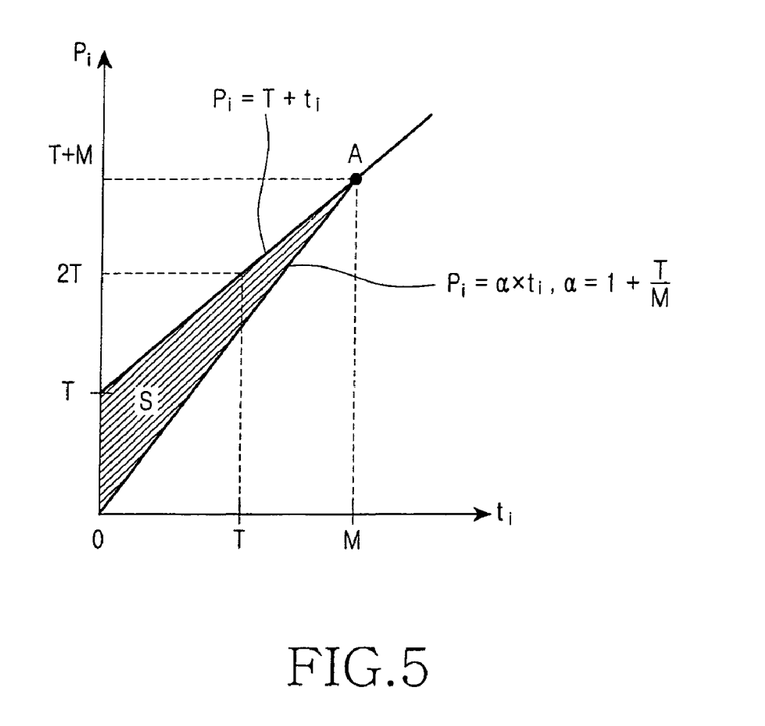
FIG. 5 illustrates a comparison between the conventional play-out time and the play-out time in the DMB receiver of the present invention.

FIG. 5 illustrates a comparison between the conventional play-out time and the play-out time in the DMB receiver of the present invention.

As illustrated in FIG. 5, the conventional playback buffer 220 receives a frame in which $t_i=0$ and outputs the frame to the video decoder 230 after T sec. However, in the present invention, the playback buffer 330 outputs the frame to the video decoder 340 at 0 sec without a CODEC delay. In accordance with the present invention, the display unit 370 plays the frame out at a rate of $\alpha \times t_i$ without the CODEC delay if $t_i<M$ as shown in Equation (2). If $t_i>M$, the display unit 370 plays the frame out at the frame rate of Equation (1) as in the conventional play-out method. Accordingly, used video data is immediately obtained at the frame rate of $\alpha \times t_i$ without the CODEC delay of T sec.

To satisfy Equation (2), the following two conditions are required.

First, when $t_i=M$ as shown in Equation (3), the play-out time provided in the present invention must be equal to the conventional play-out time.

Second, when $t_i=0$ as shown in Equation (4), the play-out time $P_i=0$ without a CODEC delay.

$$P_i(M)=T+M \tag{3}$$

$$P_i(0)=0 \tag{4}$$

As illustrated in FIG. 5, $\alpha$ is meaningful only in the shaded region S. That is, when a system is designed, a desired $\alpha$ value can be set by suitably adjusting $t_i$, T, and M values within the S region. Discontinuity of a frame rate occurring at "A" can be reduced according to the $\alpha$ value. $\alpha$ within the S region can be defined as shown in Equation (5).

$$(1+T/M) \times t_i \leq \alpha \times t_i \leq T+t_i \tag{5}$$

The present invention considers a simple linear function $\alpha=1+T/M$.

Figure 6A:
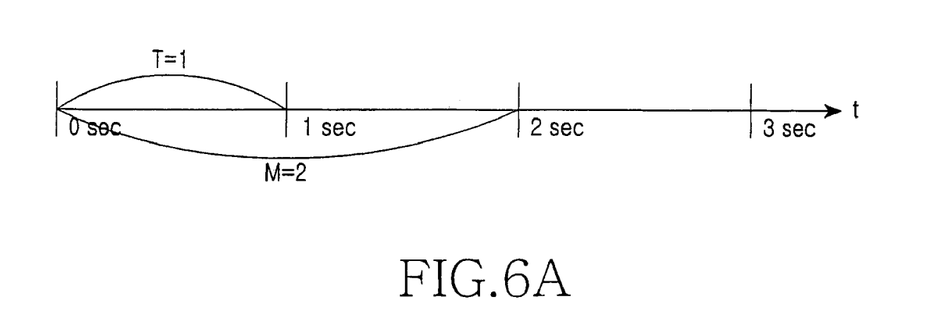
FIGS. 6A, 6B, and 6C illustrate a comparison between the conventional play-out time and the play-out time using a linear function in accordance with the present invention.
Figure 6B:
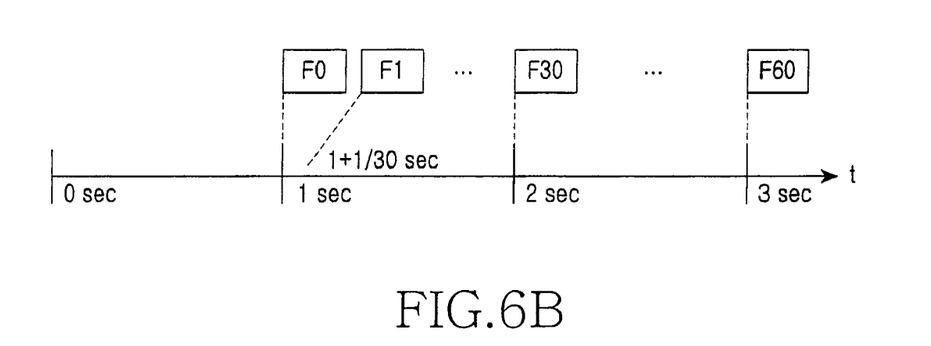
Figure 6C:
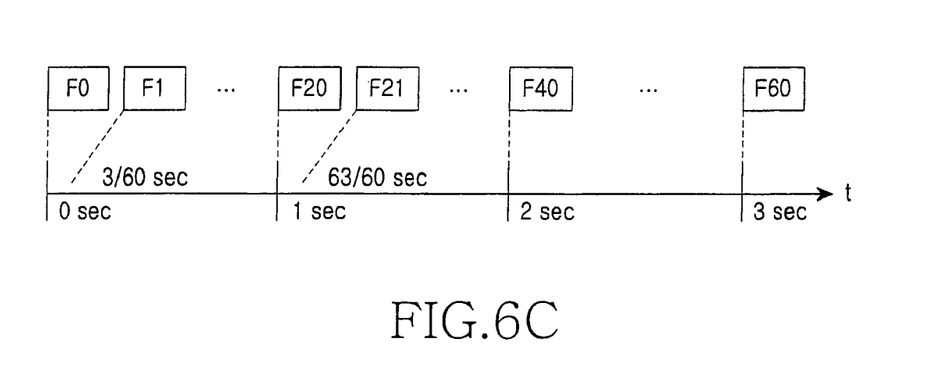

FIGS. 6A, 6B, and 6C illustrate a comparison between the conventional play-out time and the provided play-out time using the linear function. The comparison between the conventional play-out time and the provided play-out time using the linear function will be described with reference to FIGS. 6A, 6B, and 6C.

Until a frame in which $t_i=M$ is played out, a play-out process is performed at a frame rate of 20 Hz before T+M (3 sec), and is performed at a frame rate of 30 Hz after T+M (3 sec) as in the conventional method. Herein, it is assumed that the frame in which $t_i=M$ is F60.

As illustrated in FIG. 6A, it is assumed that $\alpha=1+T/M$, T=1 (sec), M=2 (sec), and Frame Rate=30 Hz.

When $t_0=0$, the conventional play-out time, $P_i$, is 1 (i.e., $P_i=1+0=1$). That is, a frame starts to be played out after 1 sec as illustrated in FIG. 6B. However, the play-out time in the present invention, $P_i$, is 0 (i.e., $P_i=(1+1/2) \times 0$). That is, a frame is immediately played out at 0 sec as illustrated in FIG. 6C.

When $t_i=1/30$, the conventional play-out time, $P_i$, is $31/30$ (i.e., $P_i=1+1/30$). That is, a frame starts to be played out after $31/30$ sec as illustrated in FIG. 6B. However, the play-out time in the present invention, $P_i$, is $3/60$ (i.e., $P_i=(1+1/2) \times 1/30$). That is, a frame is played out at $3/60$ sec as illustrated in FIG. 6C.

When $t_2=2/30$, the conventional play-out time, $P_i$, is $32/30$ (i.e., $P_i=1+2/30$). That is, a frame starts to be played out after $32/30$ sec. However, the play-out time in the present invention, $P_i$, is $6/60$ (i.e., $P_i=(1+1/2) \times 2/30$). That is, a frame is played out at $6/60$ sec.

When $t_{21}=21/30$, the conventional play-out time, $P_i$, is $51/30$ (i.e., $P_i=1+21/30$). That is, a frame starts to be played out after $51/30$ sec. However, the play-out time in the present invention, $P_i$, is $63/60$ (i.e., $P_i=(1+1/2) \times 21/30$). That is, a frame is played out at $63/60$ sec as illustrated in FIG. 6C.

From FIG. 6C, it can be seen that the present invention can immediately play a frame out without a CODEC delay.

Figure 7:
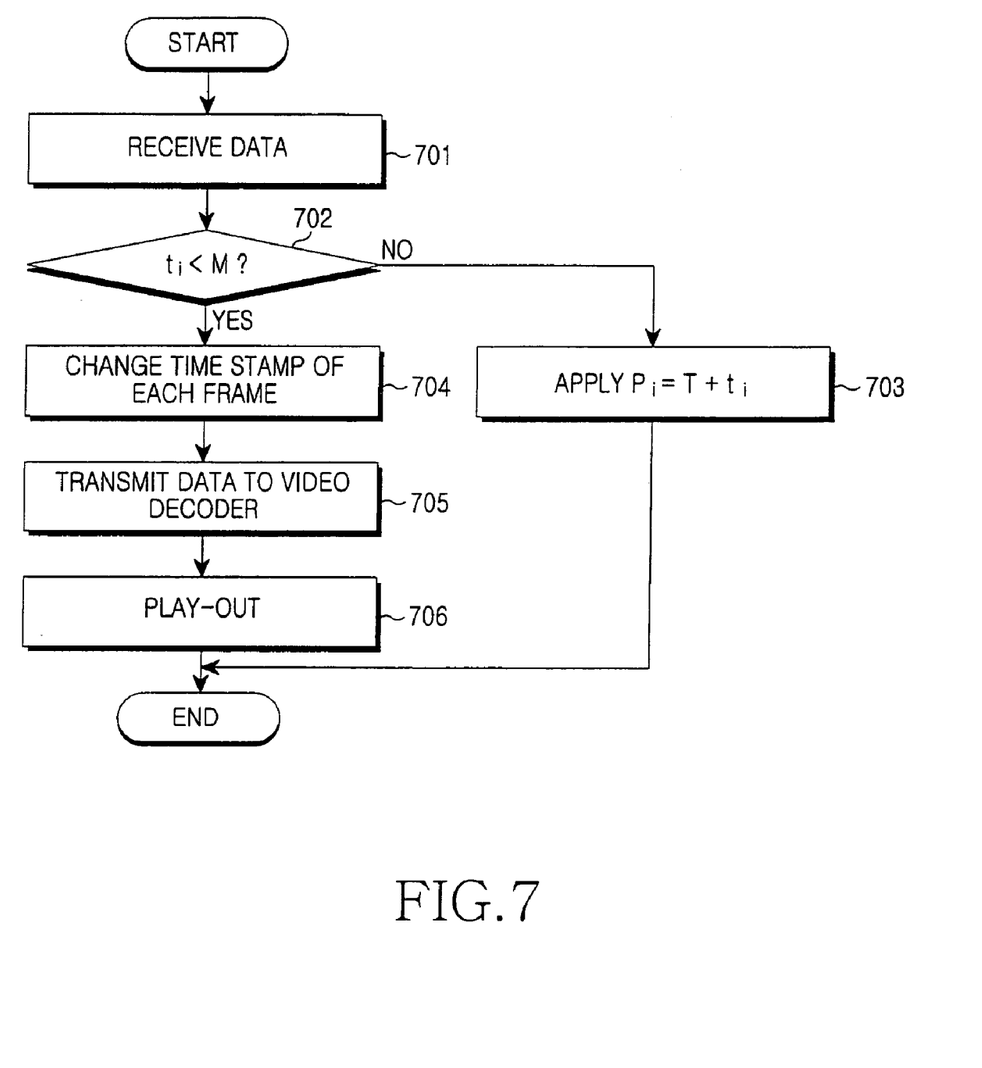
FIG. 7 is a flowchart illustrating a play-out method for switching a channel in the DMB receiver in accordance with the present invention.

FIG. 7 is a flowchart illustrating a play-out method for switching a channel in the DMB receiver in accordance with the present invention. The play-out method of the DMB receiver in accordance with the present invention will be described with reference to FIG. 7.

First, the time stamp adapter 320 receives video data from the demultiplexer 310 in step 701. Subsequently, the time stamp adapter 320 determines whether $t_i<M$ in a frame to be input to the playback buffer 330 in step 702. If $t_i \geq M$, the time stamp adapter 320 proceeds to step 703 to apply a time stamp as shown in Equation (1) to the frame to be input to the playback buffer 330 as in the conventional method.

However, if $t_i<M$, the time stamp adapter 320 proceeds to step 704 to change a time stamp of the frame to be input to the playback buffer 330 as shown in Equation (2) in the present invention. The time stamp adapter 320 includes the changed time stamp in video data and outputs the video data with the changed time stamp. Subsequently, the video data stored in the playback buffer 330 is output to the video decoder 330 according to the time stamp changed in the time stamp adapter 320 in step 705. Subsequently, the video decoder 340 decodes each frame received from the playback buffer 330 according to the changed time stamp, outputs the decoded frame to the display unit 370, such that the display unit 370 plays the decoded video data out in step 706.

Figure 8:
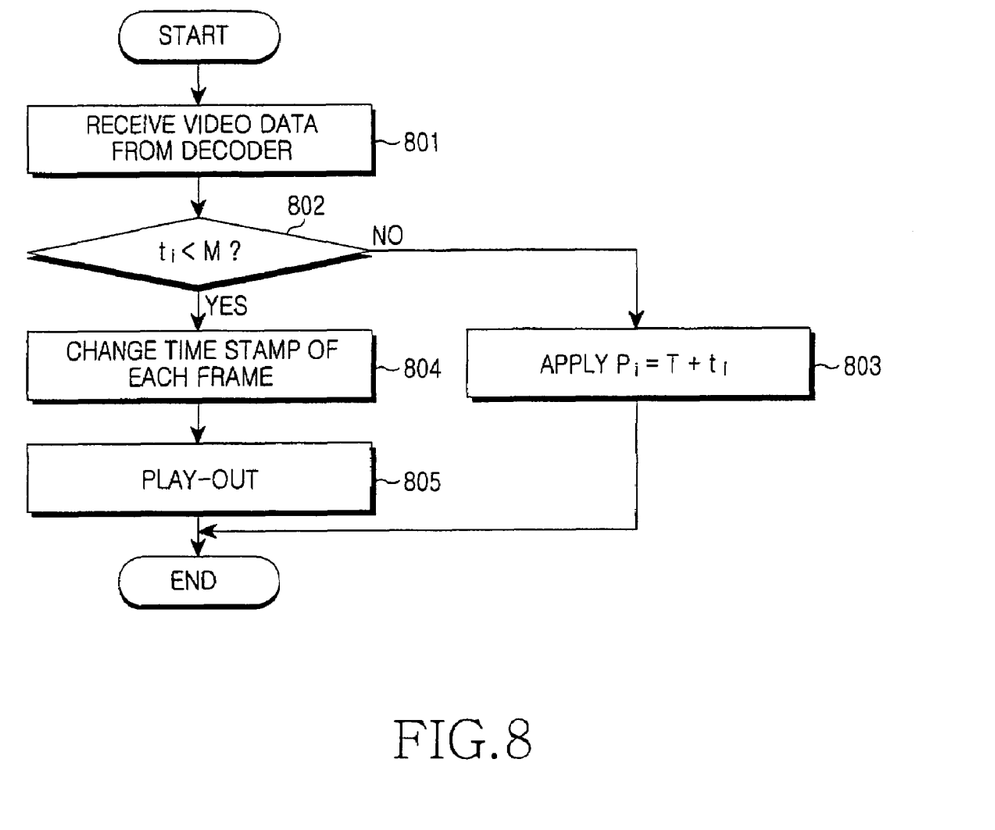
FIG. 8 is a flowchart illustrating a play-out method for switching a channel in the DMB receiver in accordance with the present invention.

FIG. 8 is a flowchart illustrating a play-out method for switching a channel in the DMB receiver in accordance with another embodiment of the present invention. FIG. 8 illustrates the play-out method when the video decoder 340 is directly connected to the output terminal of the demultiplexer 310.

First, the time stamp adapter 320 receives video data from the video decoder 340 in step 801. Subsequently, the time stamp adapter 320 determines whether $t_i<M$ in a frame to be input to the playback buffer 330 in step 802. If $t_i \geq M$, the time stamp adapter 320 proceeds to step 803 to apply a time stamp as shown in Equation (1) to the frame to be input to the playback buffer 330 as in the conventional method.

However, if $t_i<M$, the time stamp adapter 320 proceeds to step 804 to change a time stamp of the frame to be input to the playback buffer 330 as shown in Equation (2) in the present invention. The time stamp adapter 320 includes the changed time stamp in video data and outputs the video data with the changed time stamp. Subsequently, the playback buffer 330 according to the changed time stamp outputs the video data to the display unit 370. Subsequently, the display unit 370 plays each frame received from the playback buffer 330 out according to the changed time stamp in step 805.

As described above, the present invention has the following advantages. The present invention can minimize a CODEC delay at the time of switching a channel in a satellite DMB receiver. Moreover, the present invention can quickly switch a channel, thereby relieving the tedium a user feels and smoothly providing a broadcasting service.

While the present invention has been shown and described with reference to certain preferred embodiment thereof, it will be understood by those skilled in the art that various modifications, additions, and substitutions in form and details are possible, without departing from the scope of the present invention as defined by the appended claims.

What is claimed is:

1. An apparatus for reproducing broadcast data in a digital multimedia broadcasting system for providing a digital multimedia broadcasting service, the apparatus comprising:
   a demultiplexer for demultiplexing a signal received from a transmitter and outputting video data;
   a time stamp adapter for changing a time stamp for indicating a play-out time of the video data such that the video data can be immediately output from a playback buffer without a Coder-Decoder (CODEC) delay, and outputting the video data having the changed time stamp;
   the playback buffer for buffering and outputting the video data output from the time stamp adapter according to the changed time stamp;
   a video decoder for decoding and outputting the video data output from the playback buffer according to the changed time stamp; and
   a display unit for reproducing the decoded video data,
   wherein, after changing the time stamp, the time stamp adapter lowers a frame rate below a frame rate used during occurrence of the CODEC delay to accumulate video data allowed in the playback buffer.

2. The apparatus of claim 1, wherein the time stamp adapter changes the time stamp by:

$$P_i = \alpha \times t_i, \text{ if } t_i < M(\alpha = t_i, T, M)$$

$$\text{Otherwise, } P_i = T + t_i,$$

where $P_i$, is a time in which the video data is played out through the display unit, T is a buffering time in a CODEC for stable play-out, i.e., a CODEC delay, $t_i$ is a time stamp of the video data transmitted from a broadcasting station, $\alpha$ is a value for determining the frame rate, and M is a constant for determining when the time in which the video data is played out through the display unit is equal to a play-out time of a conventional system.

3. The apparatus of claim 2, wherein if $t_i = M$, the time in which the video data is played out is equal to a time in which conventional video data is played out.

4. The apparatus of claim 2, wherein if $t_i = 0$, the play-out time $P_i = 0$ without the CODEC delay.

5. The apparatus of claim 2, wherein a range of $\alpha$ is defined by:

$$(1+T/M) \times t_i \leq \alpha \times t_i \leq T + t_i.$$

6. An apparatus for reproducing broadcast data in a digital multimedia broadcasting system for providing a digital multimedia broadcasting service, the apparatus comprising:
   a demultiplexer for demultiplexing a signal received from a transmitter and outputting video data;
   a video decoder for decoding and outputting the video data output from the demultiplexer;
   a time stamp adapter for changing a time stamp for indicating a play-out time of the video data output from the video decoder such that the video data can be immediately output from a playback buffer without a Coder-Decoder (CODEC) delay, and outputting the video data having the changed time stamp;
   the playback buffer for buffering and outputting the video data output from the time stamp adapter according to the changed time stamp; and
   a display unit for reproducing the video data output from the playback buffer,
   wherein, after changing the time stamp, the time stamp adapter lowers a frame rate below a frame rate used during occurrence of the CODEC delay to accumulate video data allowed in the playback buffer.

7. The apparatus of claim 6, wherein the time stamp adapter changes the time stamp by:

$$P_i = \alpha \times t_i, \text{ if } t_i < M(\alpha = t_i, T, M)$$

$$\text{Otherwise, } P_i = T + t_i,$$

where $P_i$ is a time in which the video data is played out through the display unit, T is a buffering time in a CODEC for stable play-out, i.e., a CODEC delay, $t_i$ is a time stamp of the video data transmitted from a broadcasting station, $\alpha$ is a value for determining the frame rate, and M is a constant for determining when the time in which the video data is played out through the display unit is equal to a play-out time of a conventional system.

8. The apparatus of claim 7, wherein if $t_i = M$, the time in which the video data is played out is equal to a time in which conventional video data is played out.

9. The apparatus of claim 7, wherein if $t_i = 0$, the play-out time $P_i = 0$ without the CODEC delay.

10. The apparatus of claim 7, wherein a range of $\alpha$ is defined by:

$$(1+T/M) \times t_i \leq \alpha \times t_i \leq T + t_i.$$

11. A method for reproducing broadcast data in a digital multimedia broadcasting system for providing a digital multimedia broadcasting service, the method comprising the steps of:
    demultiplexing a signal received from a transmitter and outputting video data;
    changing a time stamp for indicating a play-out time of the video data such that the video data can be output from a playback buffer without a Coder-Decoder (CODEC) delay, and outputting the video data having the changed time stamp;
    buffering and outputting the video data in the playback buffer according to the changed time stamp;
    decoding and outputting the video data output from the playback buffer according to the changed time stamp; and
    reproducing the decoded video data,
    wherein, after changing the time stamp, the time stamp adapter lowers a frame rate below a frame rate used during occurrence of the CODEC delay to accumulate video data allowed in the playback buffer.

12. The method of claim 11, wherein the time stamp is changed by:

$$P_i = \alpha \times t_i, \text{ if } t_i < M(\alpha = t_i, T, M)$$

$$\text{Otherwise, } P_i = T + t_i,$$

where $P_i$ is a time in which the video data is played out through a display unit, T is a buffering time in a CODEC for stable play-out, i.e., a CODEC delay, $t_i$ is a time stamp of the video data transmitted from a broadcasting station, $\alpha$ is a value for determining the frame rate, and M is a constant for determining when the time in which the video data is played out through the display unit is equal to a play-out time of a conventional system.

13. The method of claim 12, wherein if $t_i = M$, the time in which the video data is played out is equal to a time in which conventional video data is played out.

14. The method of claim 12, wherein if $t_i = 0$, the play-out time $P_i = 0$ without the CODEC delay.

15. The method of claim 12, wherein a range of α is defined by:

$$(1+T/M) \times t_i \leq \alpha \times t_i \leq T + t_i.$$

16. A method for reproducing broadcast data in a digital multimedia broadcasting system for providing a digital multimedia broadcasting service, the method comprising the steps of:
- demultiplexing a signal received from a transmitter and outputting video data;
- decoding and outputting the video data;
- changing a time stamp for indicating a play-out time of the decoded video data such that the video data can be immediately output from a playback buffer without a Coder-Decoder (CODEC) delay, and outputting the video data having the changed time stamp;
- buffering and outputting the video data in the playback buffer according to the changed time stamp; and
- reproducing the video data output from the playback buffer,
- wherein, after changing the time stamp, the time stamp adapter lowers a frame rate below a frame rate used during occurrence of the CODEC delay to accumulate video data allowed in the playback buffer.

17. The method of claim 16, wherein the time stamp is changed by:

$$P_i = \alpha \times t_i, \text{ if } t_i < M(\alpha = t_i, T, M)$$

$$\text{Otherwise, } P_i = T + t_i,$$

where $P_i$ is a time in which the video data is played out through a display unit, T is a buffering time in a CODEC for stable play-out, i.e., a CODEC delay, $t_i$ is a time stamp of the video data transmitted from a broadcasting station, α is a value for determining the frame rate, and M is a constant for determining when the time in which the video data is played out through the display unit is equal to a play-out time of a conventional system.

18. The method of claim 17, wherein if $t_i = M$, the time in which the video data is played out is equal to a time in which conventional video data is played out.

19. The method of claim 17, wherein if $t_i = 0$, the play-out time $P_i = 0$ without the CODEC delay.

20. The method of claim 17, wherein a range of α is defined by:

$$(1+T/M) \times t_i \leq \alpha \times t_i \leq T + t_i.$$

* * * * *